US009467874B2

(12) United States Patent
Schwarzbauer et al.

(10) Patent No.: US 9,467,874 B2
(45) Date of Patent: Oct. 11, 2016

(54) ALLOCATION OF IDENTIFIERS FOR HOME NODE BS

(71) Applicant: Nokia Solutions and Networks Oy, Espoo (FI)

(72) Inventors: Hanns Juergen Schwarzbauer, Gröbenzell (DE); Srinivasan Selvaganapathy, Bangalore (IN); Alexander Vesely, Feldbach (AT); Dario Serafino Tonesi, Wroclaw (PL)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/375,463

(22) PCT Filed: Jan. 25, 2013

(86) PCT No.: PCT/EP2013/051421
§ 371 (c)(1),
(2) Date: Jul. 30, 2014

(87) PCT Pub. No.: WO2013/113623
PCT Pub. Date: Aug. 8, 2013

(65) Prior Publication Data
US 2015/0017925 A1    Jan. 15, 2015

(30) Foreign Application Priority Data

Jan. 30, 2012 (IN) .............................. 349/CHE/2012

(51) Int. Cl.
*H04W 24/02* (2009.01)
*H04W 8/26* (2009.01)
*H04W 84/04* (2009.01)

(52) U.S. Cl.
CPC ............... *H04W 24/02* (2013.01); *H04W 8/26* (2013.01); *H04W 84/045* (2013.01)

(58) Field of Classification Search
CPC ...................................... H04W 24/02
USPC .......... 455/67.11, 422.1, 424, 434, 436, 437, 455/452.1, 524
See application file for complete search history.

(56) References Cited

U.S. PATENT DOCUMENTS

2010/0118706 A1* 5/2010 Parkvall et al. .............. 370/241
2011/0300867 A1* 12/2011 Matsuo ............ H04W 36/0083
455/436

FOREIGN PATENT DOCUMENTS

EP      2 079 258 A1    7/2009
GB      2482071 A       1/2012
WO      WO 2011/023234 A1   3/2011

OTHER PUBLICATIONS

RFC: 791, "Internet Protocol, DARPA Internet Program, Protocol Specification", Sep. 1981, Information Sciences Institute, University of So. California, 49 pgs.
3GPP TS 25,331 V11.0.0 (Dec. 2011), "3rd Generation Partnership Project; Technical Specification Group Radio Access Network; Radio Resource Control (RRC); Protocol specification (Release 11)", Sections 8, 10, and Annex B, 692 pgs.

* cited by examiner

*Primary Examiner* — Tuan H Nguyen
(74) *Attorney, Agent, or Firm* — Harrington & Smith

(57) ABSTRACT

A technique: including receiving neighbouring cell information specifying one or more cells as neighbouring cells for a first cell of a plurality of cells associated with a gateway entity; and selecting based on said neighbouring cell information an identifier for said first cell that distinguishes said first cell from any other cell of said plurality of cells associated with said gateway entity that specifies one or more neighbouring cells in common with said first cell.

17 Claims, 7 Drawing Sheets

FIG 7
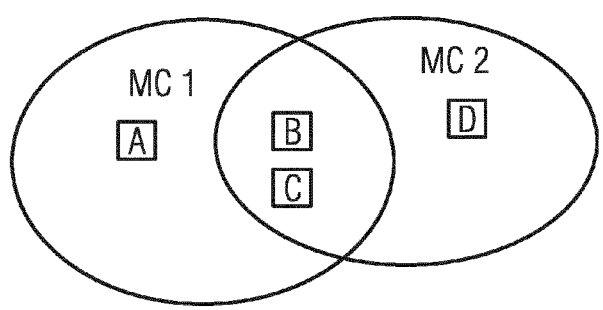
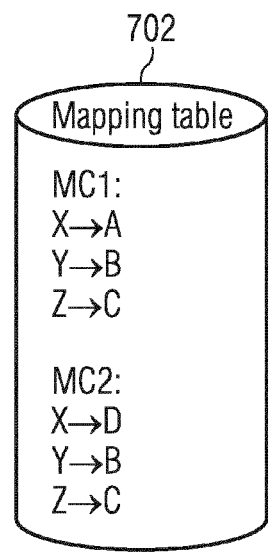

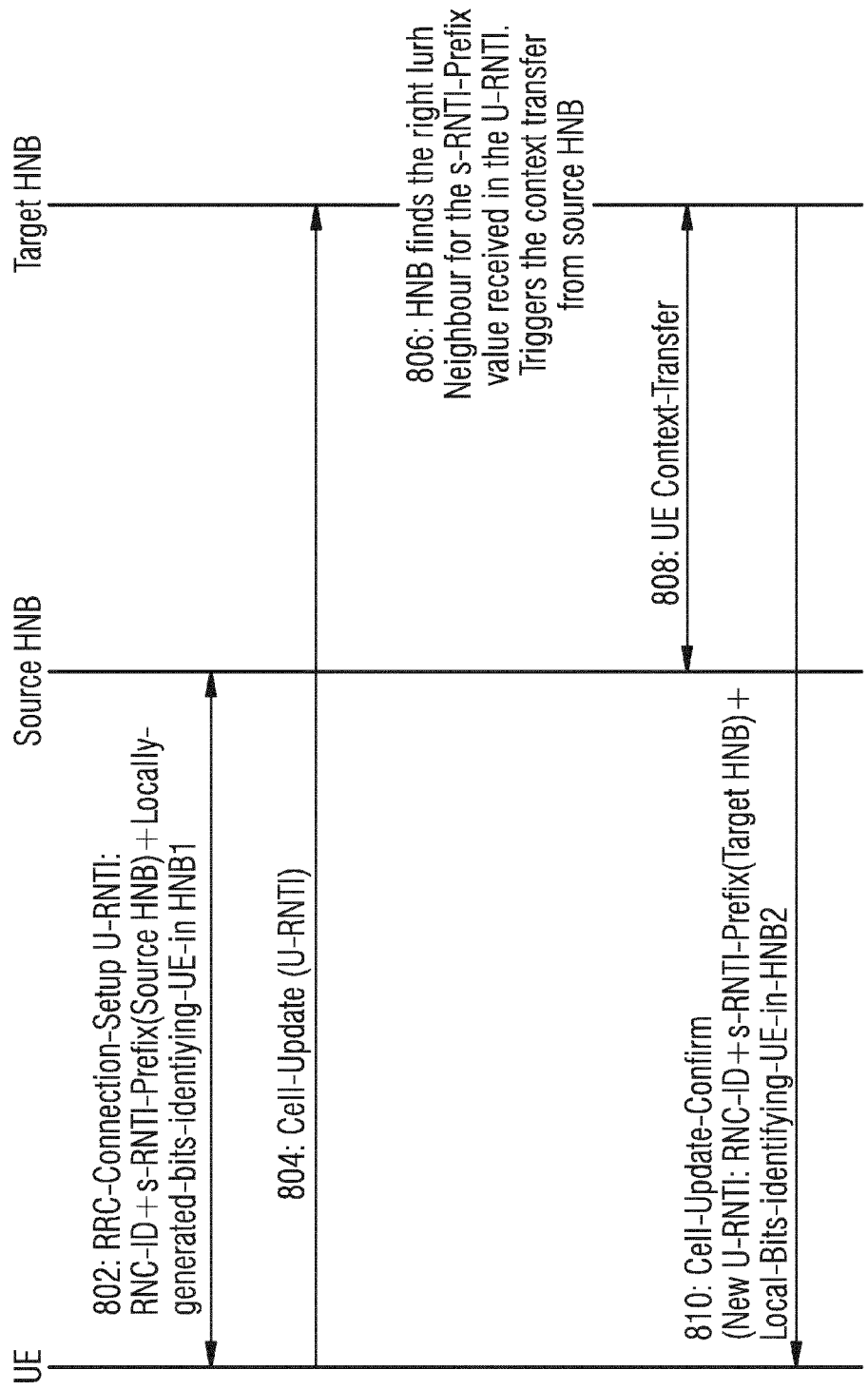

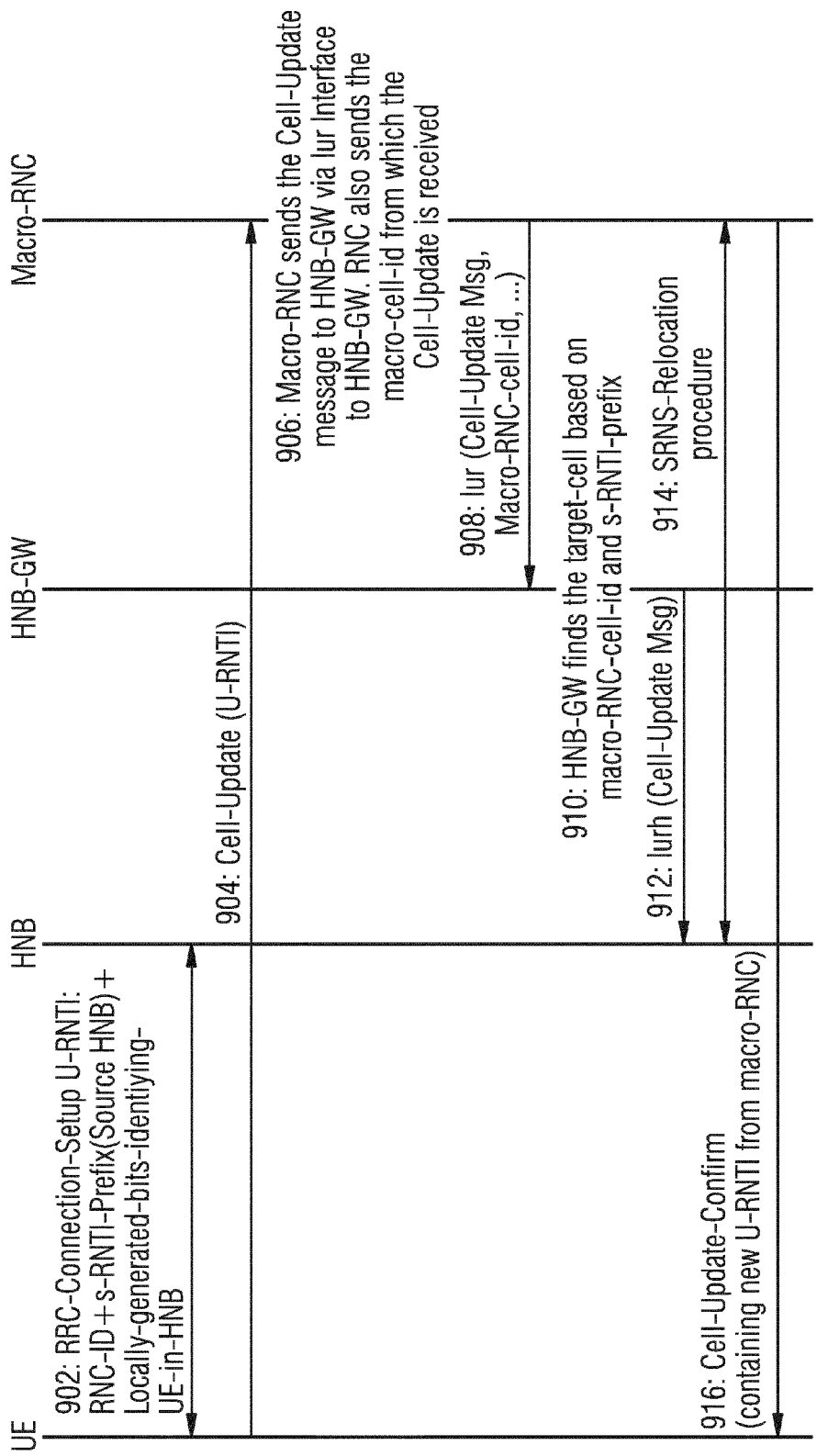

ALLOCATION OF IDENTIFIERS FOR HOME NODE BS

The operation of a cellular access network typically involves a communication device moving from one cell to another cell.

For a communication device in some connection states, the cell change procedure makes use of a temporary identifier for the communication device based on a combination of (i) a radio network controller identifier (RNC-ID) by which the serving radio network controller (SRNC) is identified to the core network (CN) and (ii) a temporary identifier by which the communication device is uniquely identified to the SRNC.

A problem can arise in a situation where a plurality of radio nodes, e.g. HNBs, share a common RNC-ID. One example of such sharing of RNC-ID is the use of a common RNC-ID by all Home NodeBs (HNBs) that are connected to the core network via the same Home NodeB Gateway (HNB-GW). This is due to the fact that the core network uses the RNC-ID to identify the radio network controllers and from core network perspective the HNB-GW is considered to be a radio network controller.

There has been identified the challenge of providing a new technique to uniquely identify a source radio node in a cell change procedure in the above-mentioned kind of situation, whilst allowing the source radio node freedom in selecting temporary identifiers for the communication devices that it serves.

There is hereby provided a method comprising: receiving neighbouring cell information specifying one or more cells as neighbouring cells for a first cell of a plurality of cells associated with a gateway entity; and selecting based on said neighbouring cell information an identifier for said first cell that distinguishes said first cell from any other cell of said plurality of cells associated with said gateway entity that specifies one or more neighbouring cells in common with said first cell.

There is also hereby provided a method comprising: receiving, in relation to a cell change to a target cell from a first cell of a plurality of cells associated with a gateway entity, a message including (i) an identifier for said target cell, and (ii) an identifier selected for said first cell on the basis of neighbouring cell information registered for said first cell, and which distinguishes said first cell from any other of said plurality of cells associated with said gateway entity that specifies one or more neighbouring cells in common with said first cell; and determining the identity of said first cell from said identifier for said target cell and said identifier for said first cell.

According to one embodiment, said determining comprises: referring to a mapping table that maps (a) the respective identities of cells associated with said gateway entity to (b) identifiers allocated to cells associated with said gateway entity, for each of a plurality of cells specified as neighbouring cells by cells associated with said gateway entity.

According to one embodiment, said first cell is a Home NodeB cell, and said target cell is a macro cell.

There is also hereby provided a method comprising: sending to a gateway entity a request to register a first cell having a radio network controller sharing a radio network controller identifier with at least one other radio network controller, wherein said request includes neighbouring cell information for said first cell to be used in selecting an identifier for said first cell.

According to one embodiment, the method further comprises: receiving from said gateway entity said identifier selected for said first cell on the basis of neighbouring cell information for said first cell; and communicating, to a communication device requesting a connection to said first cell, an identifier for said communication device; which identifier includes: (i) said identifier selected for said first cell based on said neighbouring cell information, and (ii) an identifier selected by said first cell for said communication device and which distinguishes said communication device from any other communication device served by said first cell.

According to one embodiment, said gateway entity is a Home NodeB gateway entity.

There is also hereby provided an apparatus comprising: a processor and memory including computer program code, wherein the memory and computer program code are configured to, with the processor, cause the apparatus to: receive neighbouring cell information specifying one or more cells as neighbouring cells for a first cell of a plurality of cells associated with a gateway entity; and select based on said neighbouring cell information an identifier for said first cell that distinguishes said first cell from any other cell of said plurality of cells associated with said gateway entity that specifies one or more neighbouring cells in common with said first cell.

There is also hereby provided an apparatus comprising: a processor and memory including computer program code, wherein the memory and computer program code are configured to, with the processor, cause the apparatus to: receive, in relation to a cell change to a target cell from a first cell of a plurality of cells associated with a gateway entity, a message including (i) an identifier for said target cell, and (ii) an identifier selected for said first cell on the basis of neighbouring cell information registered for said first cell, and which distinguishes said first cell from any other of said plurality of cells associated with said gateway entity that specifies one or more neighbouring cells in common with said first cell; and determine the identity of said first cell from said identifier for said target cell and said identifier for said first cell.

According to one embodiment, the memory and computer program code are further configured to, with the processor, cause the apparatus to: refer to a mapping table that maps (a) the respective identities of cells associated with said gateway entity to (b) identifiers allocated to cells associated with said gateway entity, for each of a plurality of cells specified as neighbouring cells by cells associated with said gateway entity.

According to one embodiment, said first cell is a Home NodeB cell, and said target cell is a macro cell.

There is also hereby provided an apparatus comprising: a processor and memory including computer program code, wherein the memory and computer program code are configured to, with the processor, cause the apparatus to: send to a gateway entity a request to register a first cell having a radio network controller sharing a radio network controller identifier with at least one other radio network controller, wherein said request includes neighbouring cell information for said first cell to be used in selecting an identifier for said first cell.

According to one embodiment, the memory and computer program code are further configured to, with the processor, cause the apparatus to: receive from said gateway entity said identifier selected for said first cell on the basis of neighbouring cell information for said first cell; and communicate, to a communication device requesting a connection to said first cell, an identifier for said communication device; which identifier includes: (i) said identifier selected for said first cell based on said neighbouring cell information, and (ii) an identifier selected by said first cell for said communication device and which distinguishes said communication device from any other communication device served by said first cell.

According to one embodiment, said gateway entity is a Home NodeB gateway entity.

There is also hereby provided a computer program product comprising program code means which when loaded into a computer controls the computer to: receive neighbouring cell information specifying one or more cells as neighbouring cells for a first cell of a plurality of cells associated with a gateway entity; and select based on said neighbouring cell information an identifier for said first cell that distinguishes said first cell from any other cell of said plurality of cells associated with said gateway entity that specifies one or more neighbouring cells in common with said first cell.

There is also hereby provided a computer program product comprising program code means which when loaded into a computer controls the computer to: receive, in relation to a cell change to a target cell from a first cell of a plurality of cells associated with a gateway entity, a message including (i) an identifier for said target cell, and (ii) an identifier selected for said first cell on the basis of neighbouring cell information registered for said first cell, and which distinguishes said first cell from any other of said plurality of cells associated with said gateway entity that specifies one or more neighbouring cells in common with said first cell; and determine the identity of said first cell from said identifier for said target cell and said identifier for said first cell.

There is also hereby provided a computer program product comprising program code means which when loaded into a computer controls the computer to: send to a gateway entity a request to register a first cell having a radio network controller sharing a radio network controller identifier with at least one other radio network controller, wherein said request includes neighbouring cell information for said first cell to be used in selecting an identifier for said first cell.

A detailed description of embodiments follows hereunder, by way of example only, with reference to the accompanying drawings, in which:

FIG. 1 illustrates an example of a cellular network involving macro cells and Home NodeBs (HNBs);

FIG. 2 schematically illustrates an example of user equipment operable in the network of FIG. 1;

FIG. 3 schematically illustrates an example of an apparatus suitable for use at the macro NodeBs and HNBs of FIG. 1;

FIG. 4 schematically illustrates an example of an apparatus suitable for use at the macro RNC 10 of FIG. 1 and HNB Gateway (HNB-GW) 14 of FIG. 1;

FIGS. 5 and 8 illustrate an example of a HNB registration procedure according to an embodiment of the invention;

FIG. 7 illustrates a mapping technique used in an embodiment of the present invention; and FIG. 9 illustrates an example of a HNB→HNB cell change procedure according to an embodiment of the present invention.

An embodiment of the invention is described below in detail, by way of example only, in the context of a mobile telecommunication network operating in accordance with 3GPP standards and providing 3G services via cellular base stations including macro cells of relatively large coverage and HNB cells of smaller coverage. However, the same kind of techniques are also of use in other kinds of mobile telecommunication networks in which (a) a cell change procedure makes use of a radio network temporary identifier (RNTI) for the communication device based on a combination of (i) an RNC-ID and (ii) a RNTI allocated to the communication device; and (b) a common RNC-ID is used for a plurality of network entities allocating RNTIs to communication devices.

Figure 1:
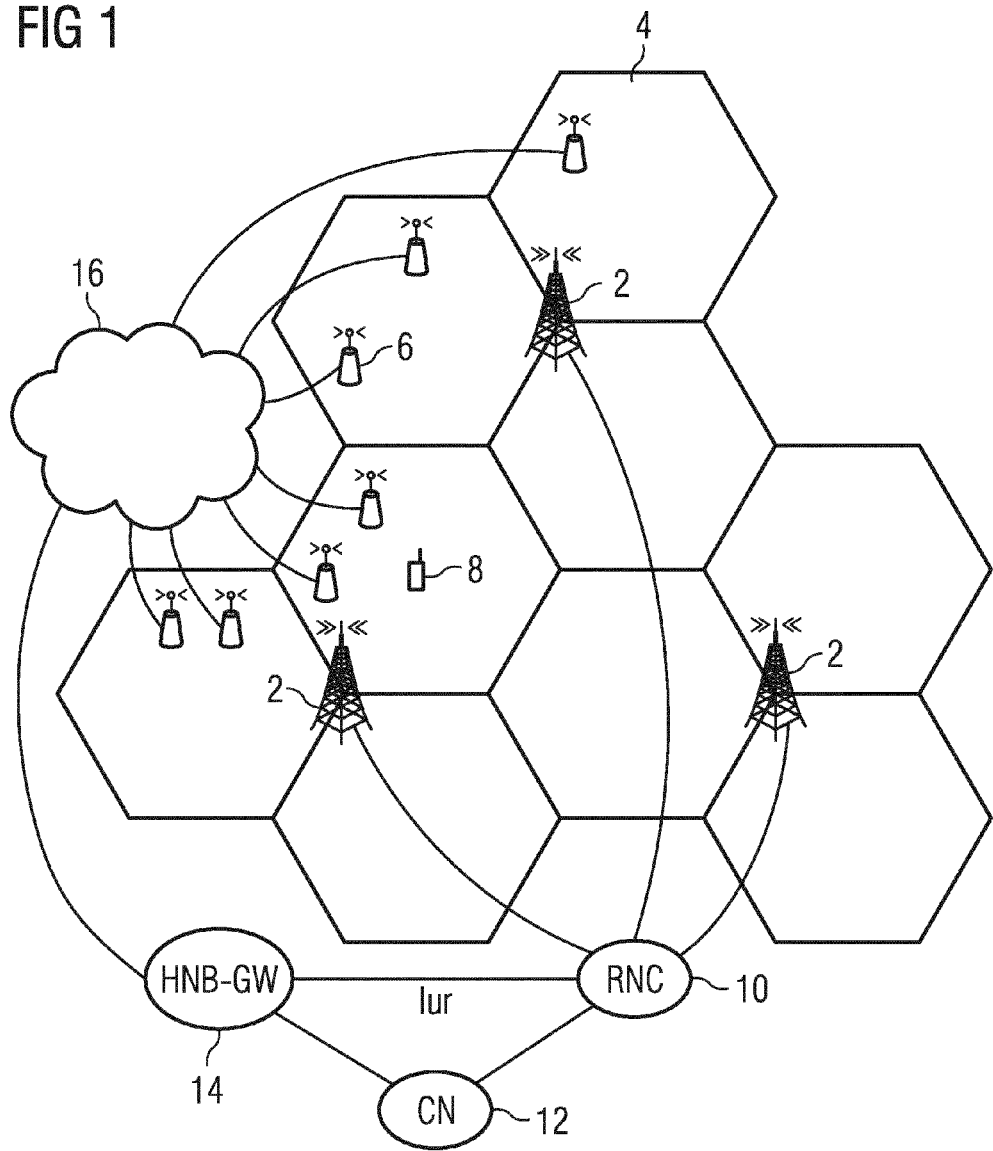

FIG. 1 illustrates an example of a mobile telecommunication network (MTN) involving macro cells 4 with transceivers at respective macro base stations called NodeBs (NBs) 2 and HNB cells with transceivers at respective HNBs 6.

Only nine macro cells are shown in FIG. 1, but a mobile telecommunication network will typically comprise tens of thousands of macro cells. Also, only some of the macro cells are shown as being dotted with a small number of HNB cells, but typically all macro cells are dotted with large numbers of HNB cells. The HNB cells are useful, for example, for providing good service to indoor users in homes or small offices or shopping malls.

The plurality of macro NBs 2 are connected to a common RNC 10. The RNC 10 performs radio resource management and some of the mobility management functions for the UEs 8 served by the macro NBs 2 (base stations) connected to the RNC 10. Each HNB 6, together with the HNB-GW 14, acts similar to a combination of a single cell base station and a radio network controller (RNC).

The macro RNC 10 is connected to the core network (CN) 12 including a packet-switched part including GPRS support nodes. The HNBs 6 are connected to the same core network via the internet 16 and a Home NodeB Gateway (HNB-GW) 14. HNB-GW 14 acts as a concentrator of HNBs and presents itself to the CN 12 as a single RNC; and all the HNBs 6 connected to CN 12 via the same HNB-GW 14 share a common RNC-ID.

Figure 2:
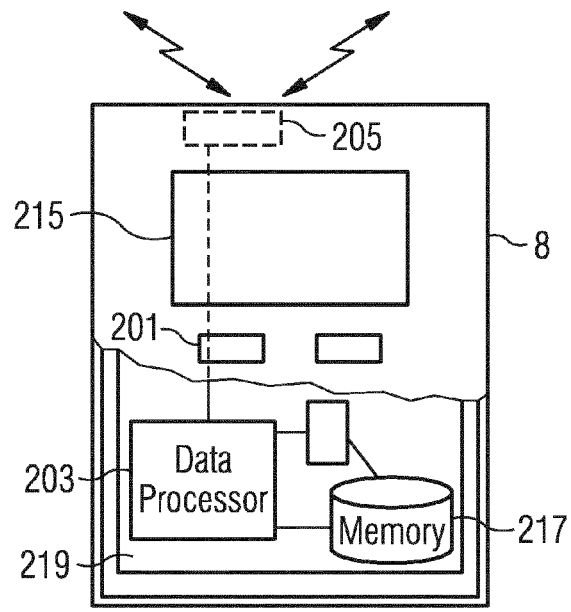

FIG. 2 shows a schematic partially sectioned view of an example of user equipment 8 that may be used for communicating with the macro NBs 2 and HNBs 6 of FIG. 1 via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals to or from the macro NBs 2 and small cell HNBs 6. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part and associated antenna arrangement. The antenna arrangement may be arranged internally or externally to the UE 8.

The UE 8 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) (not shown) to other devices and/or for connecting external accessories, for example hands-free equipment, thereto.

Figure 3:
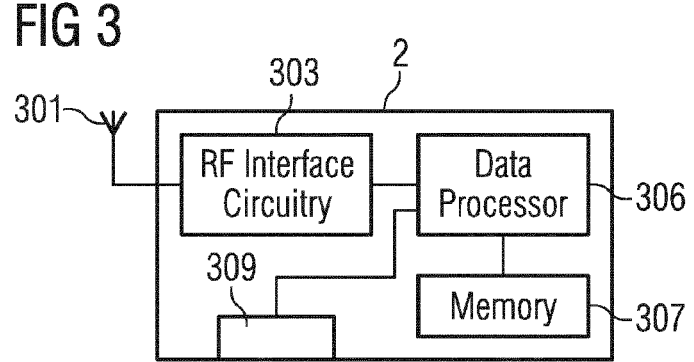

FIG. 3 shows an example of apparatus for use at the small cell HNBs 6 and macro NBs 2. The apparatus comprises a radio frequency antenna 301 configured to receive and transmit radio frequency signals; radio frequency interface circuitry 303 configured to interface the radio frequency signals received and transmitted by the antenna 301 and the data processor 306. The radio frequency interface circuitry 303 may also be known as a transceiver. The apparatus also comprises an interface 309 via which it can send and receive information to and from one or more other network nodes e.g. MSC/SGSN/MME or O&M entity. The data processor 306 is configured to process signals from the radio frequency interface circuitry 303, control the radio frequency interface circuitry 303 to generate suitable RF signals to communicate information to the UE 8 via the wireless communications link, and also to exchange information with other network nodes via the interface 309. The memory 307 is used for storing data, parameters and instructions for use by the data processor 306.

Figure 4:
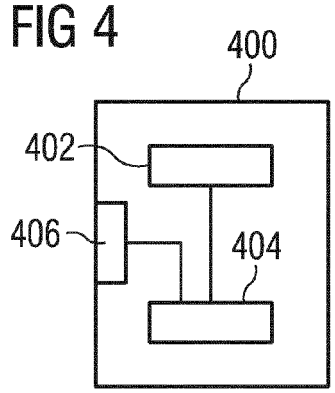

FIG. 4 shows an example of apparatus for use at the macro RNC 10 and the HNB-GW 14. The apparatus 400 includes a memory 402 for receiving and storing data of the kind mentioned below in the description of an embodiment of the present invention, and a data processor 404 for processing data stored in memory 402 and making computations and determinations of the kind mentioned below in the description of an embodiment of the present invention. The apparatus also comprises an interface 406 via which it can send and receive information to and from other network nodes.

It would be appreciated that the apparatus shown in each of FIGS. 2 to 4 and described above may comprise further elements which are not directly involved with the embodiments of the invention described hereafter.

UE 8 can be in a special connected state in which it is not allocated a dedicated physical channel. One example of such a connected state is e.g. the CELL_FACH state described at 3GPP 25.331 Section 7.2.2.2. The CELL_FACH state is characterised by a lower power consumption rate (e.g. about 50%) at UE 8 compared to the CELL_DCH state described at 3GPP 25.331 Section 7.2.2.3, in which UE 8 is allocated a dedicated physical channel. A dedicated physical channel is a channel by which data can be sent to and from UE 8 without requiring prior reservation of resources.

In the CELL_FACH state, a cell change procedure begins with UE 8 sending a cell update message to the new NodeB (e.g. macro NB or HNB) that has been identified as a target cell (e.g. by the measurement at UE 8 of reference signals transmitted by the new NodeB); and is followed by the new NodeB forwarding the cell update message to the source NodeB (e.g. HNB). It is therefore required that the source NodeB can be identified by information included in the cell update message.

UE 8 is identified in cell change procedures by a radio network temporary identifier (u-RNTI) comprising a combination of (i) the RNC ID for the RNC serving UE 8 (SNRC) and (ii) the radio network temporary identifier (s-RNTI) that the SRNC uses to uniquely identify UE 8 from all the other UEs served by the same RNC. According to one example, the RNC-ID is a 12-bit number, and the s-RNTI is a 20-bit number. As mentioned above, HNBs 6 connected to the same HNB-GW 14 share the same RNC-ID. Accordingly, for unique identification of UE 8 in a cell update message from UE served by a HNB, it is necessary to ensure that there is no irresolvable clash between the temporary identifiers (s-RNTIs) assigned to UE 8 by the serving HNB 6 and temporary identifiers (s-RNTIs) assigned to other UEs by other HNBs 6 connected to the same HNB-GW 14.

Figure 5:
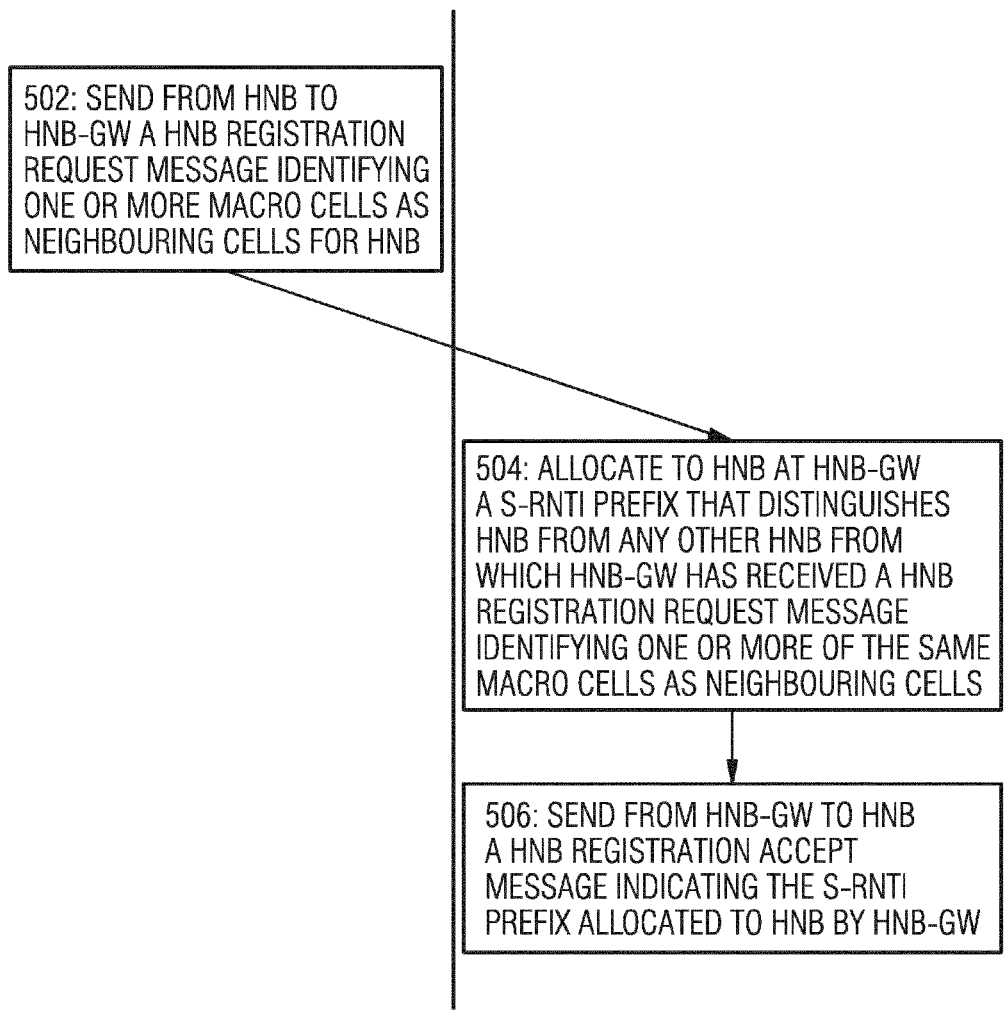

FIG. 5 illustrates an example of a HNB Registration procedure according to an embodiment of the present invention.

When a HNB 6 is powered up, it sends to HNB-GW 14 a HNB Registration Request message according to the HNBAP (Home NodeB Application) protocol, which message includes additional information identifying one or more macro cells as neighbouring cells (STEP 502). For example, the neighbouring macro cells could be determined from measurements made by HNB of the power at which it detects macro cell reference signals. For example, the information in the Registration Request message could identify up to e.g. 4 macro cells whose reference signal is detected at HNB 6 at the highest received power (RSRP) and exceeds a predetermined RSRP threshold.

The HNB Registration Request message also includes information identifying neighbouring HNBs, which as discussed later, is useful for cell changes from HNB 6 to a neighbouring HNB.

Based on the information about neighbouring macro cells in the HNB Registration Request message, HNB-GW selects for HNB 6 a s-RNTI prefix that distinguishes HNB 6 from any other HNB that is connected to HNB-GW 14 and has specified one or more neighbouring cells (macro cells or HNB cells) in common with HNB 6 (STEP 504). With reference to FIG. 7, HNB-GW 14 creates a mapping table 702 in which s-RNTI prefixes are mapped to HNB identities for each cell that has been specified as a neighbouring cell by any one of the HNBs registered with HNB-GW14. For the simple example of FIG. 7, four HNBs A, B, C and D are registered with HNB-GW. HNB A specifies macro cell MC 1 only as a neighbouring cell; HNBs B and C both specify both macro cells MC1 and MC2 as neighbouring cells; and HNB D specifies macro cell MC 2 only as a neighbouring cell. HNB-GW creates a mapping table 702, in which s-RNTI prefixes are mapped to HNB identities for each of macro cells MC1 and MC2. s-RNTI prefixes X, Y and Z are respectively allocated to HNBs A, B and C. One characteristic of the method as described subsequently is assigning s-RNTI prefixes uniquely for HNBs commonly located in the coverage area of a reported macro NB and also uniquely within the radio coverage of a neighbouring HNB. The HNBs are grouped according to the identities of the macro NBs that they report as neighbouring cells. HNBs A, B, C have unique s-RNTIs assigned thereto to allow retrieval of the UE context in case a UE performs the cell update procedure with the macro NB MC1. Similarly for HNBs reporting macro NB MC2 as a neighbour cell: HNBs B, C and D are located in the coverage area of macro NB MC2 and have unique s-RNTI values assigned thereto. Recognising that HNB A is reporting only macro NB MC1 but not macro NB MC2 allows that the s-RNTI prefix X can also be used for HNB D, because D does not specify macro cell MC1 as a neighbouring cell i.e., more generally, does not share any neighbouring cells with HNB A, to which s-RNTI prefix X is also allocated. As a general principle, s-RNTI values could be re-used of nodes not sharing one or more common neighbouring nodes, which could comprise both macro NBs and HNBs. Furthermore these nodes are not necessarily direct neighbours that a UE would be able to address in a CELL-UPDATE procedure.

HNB-GW ends the HNB registration procedure by sending a HNB-Registration-Accept message to HNB 6 (STEP 506), which message specifies the s-RNTI prefix that has been allocated to HNB 6. The HNB-GW also provides HNB 6 with information about the neighbouring cells of HNB, which neighbouring cells may include cells of other HNBs or macro cells. For neighbouring HNB cells, the HNB-GW may provide an indication which allows HNB 6 to identify and communicate with the HNB node for the neighbouring HNB cells, eg., a Transport Network Layer Address of the HNB which may be an address according to the Internet Protocol RFC791, or according to the Asynchronous Transmission Mode ATM protocols, a Radio Network Layer identification of the HNB which may be a s-RNTI prefix of the neighbouring HNBs within the same HNB-GW. The HNB may determine if a neighbouring cell relates to a neighbouring HNB by evaluating the RNC-ID and the s-RNTI of the neighbouring cell. If RNC-ID of neighbouring cell is equal to its own RNC-ID, both are connected to the same common node HNB-GW and the s-RNTI prefix value distinguishes both HNBs within the common node HNB-GW. HNB may determine the neighbouring HNB and the related communication address by matching the s-RNTI prefix value with previously received neighbour cell information from HNB-GW and may send a message to the HNB using the related Transport Network Layer Address of the HNB.

When a RRC connection is set up between HNB 6 and UE 8, HNB allocates a u-RNTI to UE 8. In one example, this u-RNTI is a 32-bit number, which comprises: (a) a 10-bit RNC-ID for the HNB 6 which is also the RNC-ID for all other HNBs connected to the CN via the same HNB-GW 14; and (b) a 20-bit s-RNTI, which itself comprises (i) the s-RNTI prefix allocated to HNB 6 by HNB-GW and (ii) a 10-bit number allocated to the UE 8 by HNB 6 which distinguishes UE 8 from any other UE served by the same HNB 6. As a further embodiment, the lengths of the s-RNTI prefix in bits may be different to 10 bits as in this example. The actually used s-RNTI prefix length may be assigned by HNB-GW 14 as well as the s-RNTI prefix value and shared with HNB 6. A different s-RNTI prefix length allows a different maximum number of identifiable HNBs to be registered at the HNB-GW 14. On the other hand, since the s-RNTI prefix reserves a certain part of the 20-bit s-RNTI values, less numbers are available to HNB 6 to distinguish and identify a UE 8 from all other UEs served by the HNB 6. As a further embodiment, the lengths (i.e. number of bits) of the s-RNTI prefix may be assigned dynamically upon registration of a HNB 6 at the HNB-GW 14 and communicated to the HNB 6, which may allow the adjustment of network resources according to HNB performance or the number of UEs attaching to the HNB 6 and remaining attached for some time period.

Figure 6:
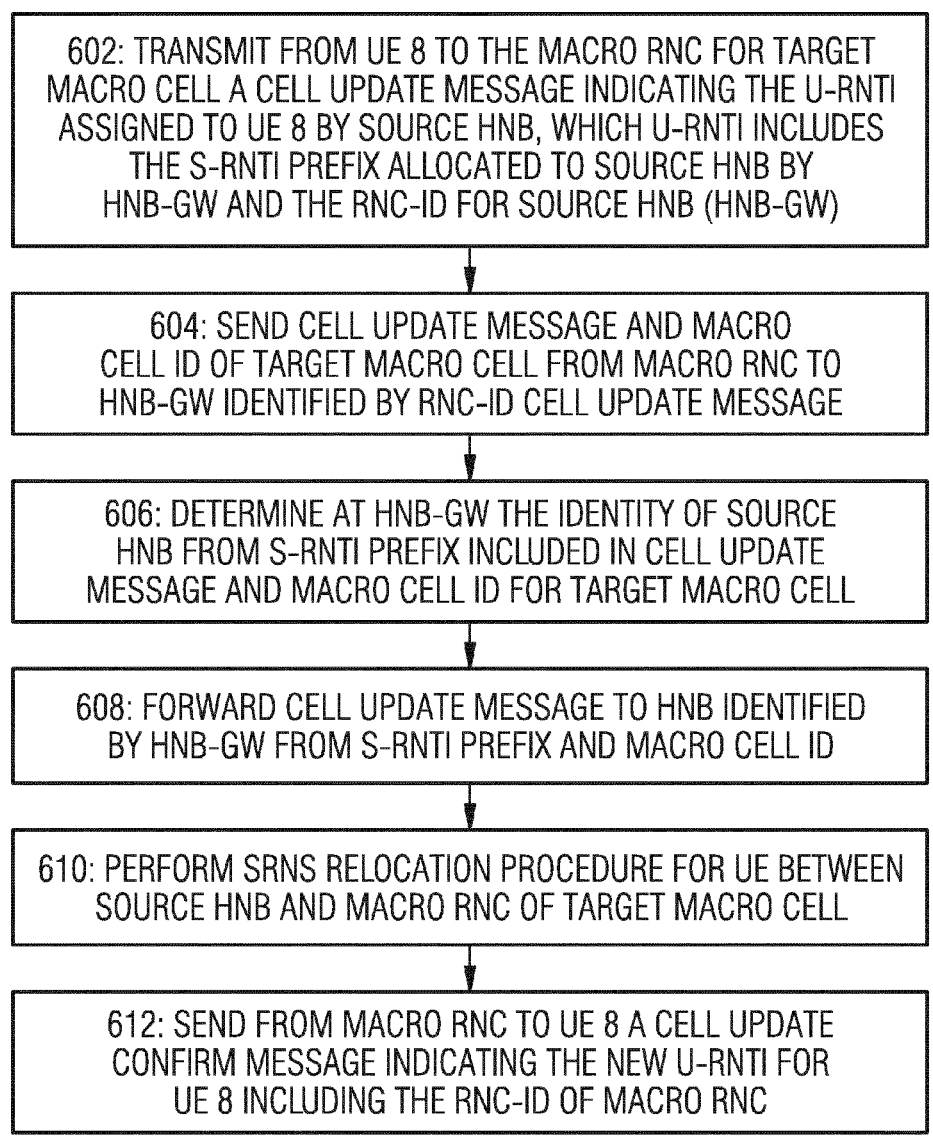
FIG. 6 illustrates an example of a HNB→macroNB cell change procedure according to an embodiment of the present invention.

FIG. 6 illustrates an example of a HNB→macroNB cell change procedure according to an embodiment of the present invention.

FIG. 6 illustrates a cell change procedure after UE 8 in a CELLFACH state of connection with HNB (Source HNB) has identified a macro cell 4 as a target cell. UE 8 transmits eg., via the NodeB 2 for the target macro cell 4, to the macro RNC 10 for the target macro cell 4 a cell update message indicating the u-RNTI assigned to UE 8 by the source HNB (STEP 602).

Macro RNC 10 sends the cell update message to the HNB-GW 14 identified by the RNC-ID included in the cell update message, together with a macro cell ID for the target macro cell (STEP 604).

HNB-GW 14 determines the identity of source HNB from (a) the s-RNTI prefix forming part of the u-RNTI included in the cell update message and (b) the macro cell ID (STEP 606). In more detail, the HNB-GW consults the mapping table 702 it has created including mapping of s-RNTI to HNB identity for each macro cell ID. For the simple example illustrated in FIG. 7: if the macro cell ID received at HNB-GW from macro RNC 10 is MC 1, and the s-RNTI prefix forming part of the u-RNTI specified in the cell update message is X, HNB-GW can determine that the source HNB is HNB A.

HNB-GW next forwards the cell update message to the HNB identified from the combination of the s-RNTI prefix and the macro cell ID (STEP 608).

A conventional SRNS (Serving Radio Network Subsystem) Relocation procedure is then performed between Source HNB 6 and the macro RNC 10 for the target macro cell (STEP 610), by which procedure the PDP (Packet Data Protocol) context is transferred to macro RNC 10 from source HNB 6. As a result, the information already collected at Source HNB concerning this UE as PDP context is moved to the node of the new cell RNC in order to provide continued service to the UE. The PDP context is referred to as UE context as well and may include UE authorisation information, UE configuration information, UE state information and avoids re-synchronisation between UE and network upon cell changes.

When the SRNS Relocation procedure is completed, macro RNC 10 sends a cell-update-confirm message to UE 8, which message includes a new u-RNTI for UE 8, as allocated to it by macro RNC 10.

In the event that UE 8 in a CELL_FACH connection state with Source HNB 6 identifies a neighbouring HNB cell as a target cell, it transmits to the target HNB 6 a cell-update message including the u-RNTI allocated to UE 8 by Source HNB. As mentioned above, target HNB will have been one of the HNBs identified as a neighbouring HNB in the HNB Registration Request message sent from source HNB 6 to HNB-GW 14 at the time of registration of Source HNB with HNB-GW 14. HNB-GW 14 will have already informed all HNBs 6 identified as neighbouring HNBs by Source HNB of the s-RNTI prefix and Transport Network Layer address (IP address) for Source HNB. Accordingly, when neighbouring HNB 6 receives a cell update message from UE 8, it can determine the IP address for the source HNB from the s-RNTI prefix included in the received cell update message, and can thereby communicate directly with Source HNB for the PDP context transfer from Source HNB to Target HNB. As mentioned above, the s-RNTI prefixes are allocated by HNB-GW 14 such that the s-RNTI prefix also distinguishes between HNBs specifying one or more neighbouring HNB cells in common. When the PDP context transfer is completed, target HNB transmits a Cell-Update-Confirm message to UE 8, which message includes a new u-RNTI for UE 8, as allocated to it by Target HNB 6. The new u-RNTI will include the same RNC-ID as the old u-RNTI (because both Source and Target HNBs are connected to the same HNB-GW 14), but it will include a different s-RNTI comprising a different s-RNTI prefix (as allocated to the Target HNB by HNB-GW 14) and a 10-bit number allocated to UE 8 by Target HNB and distinguishing UE 8 from any other UE served by Target HNB.

The HNB→HNB cell change procedure described above is further illustrated in FIG. 8. FIG. 8 illustrates the procedure for a cell change to a Target HNB from a Source HNB with which UE 8 has set up a RRC Connection (STEP 802) by which UE has received from Source HNB a u-RNTI including the s-RNTI prefix for Source HNB. UE sends to Target HNB a Cell-Update message including the u-RNTI assigned to it by Source HNB (STEP 804). Based on the information Target HNB has for the neighbouring HNBs of Target HNB and from the s-RNTI Prefix included in the Cell-Update message, Target HNB can determine the identity of Source HNB (STEP 806). Target HNB then initiates the context-transfer procedure to transfer the UE context from Source HNB to Target HNB (STEP 808). After context transfer is complete, Target HNB assigns a new u-RNTI to UE, which includes the s-RNTI prefix for Target HNB; and includes the new u-RNTI for UE in a Cell-Update-Confirm message to UE. The HNB-Macro cell change procedure described above is further illustrated in FIG. 9. FIG. 9 illustrates the procedure for a cell change to a Target Macro NB from a Source HNB with which UE 8 has set up a RRC Connection (STEP 902) by which UE has received from Source HNB a u-RNTI including the s-RNTI prefix for Source HNB. When UE moves to macro-coverage, UE sends a cell-update message to the RNC for the Target Macro NB, which cell-update message includes the u-RNTI assigned to UE by Source HNB (STEP 904). Macro RNC routes the Cell-Update message via the Iur interface to the HNB-GW identified by the RNC-ID forming part of the u-RNTI included in the cell-update message (STEP 908). Macro RNC also sends to HNB-GW an indication of the identity of the macro cell that is the target cell. On receiving the Cell-Update message, HNB-GW determines the identity of the Source HNB by referring to the part of the mapping table it maintains including mapping of s-RNTI prefixes to HNB identities for the macro cell identified as the target cell in the information received from Macro RNC (STEP 910). HNB-GW 14 forwards the cell-update message to the Source HNB (STEP 912). This triggers a SRNS Relocation procedure by which the PDP context is transferred from Source HNB to the macro-RNC for the target cell (STEP 914). Finally, Macro-RNC sends a cell-update-confirm message to UE including the new u-RNTI assigned to it by macro-RNC (STEP 916).

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process.

Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:
receiving at a gateway entity from a first cell neighbouring cell information specifying one or more cells as neighbouring cells for the first cell of a plurality of cells associated with a gateway entity; and
selecting by the gateway entity based on said neighbouring cell information an identifier for said first cell that distinguishes said first cell from any other cell of said plurality of cells associated with said gateway entity that specifies one or more neighbouring cells in common with said first cell.

2. A method comprising:
receiving at a gateway entity, in relation to a cell change to a target cell from a first cell of a plurality of cells associated with a gateway entity, a message including (i) an identifier for said target cell, and (ii) an identifier selected for said first cell on the basis of neighbouring cell information registered for said first cell, and which distinguishes said first cell from any other of said plurality of cells associated with said gateway entity that specifies one or more neighbouring cells in common with said first cell; and
the gateway entity determining the identity of said first cell from said identifier for said target cell and said identifier for said first cell.

3. A method according to claim 2, wherein said determining comprises: referring to a mapping table that maps (a) the respective identities of cells associated with said gateway entity to (b) identifiers allocated to cells associated with said gateway entity, for each of a plurality of cells specified as neighbouring cells by cells associated with said gateway entity.

4. A method according to claim 2, wherein said first cell is a Home NodeB cell, and said target cell is a macro cell.

5. A method according to claim 2, wherein said gateway entity is a Home NodeB gateway entity.

6. A method comprising:
sending to a gateway entity a request to register a first cell having a radio network controller sharing a radio network controller identifier with at least one other radio network controller, wherein said request includes neighbouring cell information for said first cell to be used by the gateway entity in selecting an identifier for said first cell.

7. A method according to claim 6, further comprising:
receiving from said gateway entity said identifier selected for said first cell on the basis of neighbouring cell information for said first cell; and
communicating, to a communication device requesting a connection to said first cell, an identifier for said communication device; which identifier includes: (i) said identifier selected for said first cell based on said neighbouring cell information, and (ii) an identifier selected by said first cell for said communication device and which distinguishes said communication device from any other communication device served by said first cell.

8. An apparatus comprising: a processor and memory including computer program code, wherein the memory and computer program code are configured to, with the processor, cause a gateway entity to: receive from a first cell neighbouring cell information specifying one or more cells as neighbouring cells for the first cell of a plurality of cells associated with a gateway entity; and select based on said neighbouring cell information an identifier for said first cell that distinguishes said first cell from any other cell of said plurality of cells associated with said gateway entity that specifies one or more neighbouring cells in common with said first cell.

9. An apparatus comprising: a processor and memory including computer program code, wherein the memory and computer program code are configured to, with the processor, cause a gateway entity to: receive, in relation to a cell change to a target cell from a first cell of a plurality of cells associated with a gateway entity, a message including (i) an identifier for said target cell, and (ii) an identifier selected for said first cell on the basis of neighbouring cell information registered for said first cell, and which distinguishes said first cell from any other of said plurality of cells associated with said gateway entity that specifies one or more neighbouring cells in common with said first cell; and determine the identity of said first cell from said identifier for said target cell and said identifier for said first cell.

10. An apparatus according to claim 9, wherein the memory and computer program code are further configured to, with the processor, cause the apparatus to: refer to a mapping table that maps (a) the respective identities of cells associated with said gateway entity to (b) identifiers allocated to cells associated with said gateway entity, for each of a plurality of cells specified as neighbouring cells by cells associated with said gateway entity.

11. An apparatus according to claim 10, wherein said first cell is a Home NodeB cell, and said target cell is a macro cell.

12. An apparatus according to claim 9, wherein said gateway entity is a Home NodeB gateway entity.

13. An apparatus comprising: a processor and memory including computer program code, wherein the memory and computer program code are configured to, with the processor, cause the apparatus to: send to a gateway entity a request to register a first cell having a radio network controller sharing a radio network controller identifier with at least one other radio network controller, wherein said request includes neighbouring cell information for said first cell to be used by the gateway entity in selecting an identifier for said first cell.

14. An apparatus according to claim 13, wherein the memory and computer program code are further configured to, with the processor, cause the apparatus to: receive from said gateway entity said identifier selected for said first cell on the basis of neighbouring cell information for said first cell; and communicate, to a communication device requesting a connection to said first cell, an identifier for said communication device; which identifier includes: (i) said identifier selected for said first cell based on said neighbouring cell information, and (ii) an identifier selected by said first cell for said communication device and which distinguishes said communication device from any other communication device served by said first cell.

15. A computer readable memory tangibly storing computer program instructions which when loaded into a computer controls a gateway entity to: receive from a first cell neighbouring cell information specifying one or more cells as neighbouring cells for the first cell of a plurality of cells associated with a gateway entity; and select based on said neighbouring cell information an identifier for said first cell that distinguishes said first cell from any other cell of said plurality of cells associated with said gateway entity that specifies one or more neighbouring cells in common with said first cell.

16. A computer readable memory tangibly storing computer program instructions which when loaded into a computer controls a gateway entity to: receive, in relation to a cell change to a target cell from a first cell of a plurality of cells associated with a gateway entity, a message including (i) an identifier for said target cell, and (ii) an identifier selected for said first cell on the basis of neighbouring cell information registered for said first cell, and which distinguishes said first cell from any other of said plurality of cells associated with said gateway entity that specifies one or more neighbouring cells in common with said first cell; and determine the identity of said first cell from said identifier for said target cell and said identifier for said first cell.

17. A computer readable memory tangibly storing computer program instructions which when loaded into a computer controls the computer to: send to a gateway entity a request to register a first cell having a radio network controller sharing a radio network controller identifier with at least one other radio network controller, wherein said request includes neighbouring cell information for said first cell to be used by the gateway entity in selecting an identifier for said first cell.

* * * * *